(12) United States Patent
Zinni

(10) Patent No.: US 8,397,348 B2
(45) Date of Patent: Mar. 19, 2013

(54) BINDING STRAP DEVICE FOR SECURING CARGO

(76) Inventor: Nicholas J. Zinni, Beachwood, OH (US)

( * ) Notice: Subject to any disclaimer, the term of this patent is extended or adjusted under 35 U.S.C. 154(b) by 155 days.

(21) Appl. No.: 13/065,784

(22) Filed: Mar. 30, 2011

(65) Prior Publication Data

US 2012/0246883 A1  Oct. 4, 2012

(51) Int. Cl.
*B25B 25/00* (2006.01)
(52) U.S. Cl. .......................... 24/68 B; 24/71.1; 24/68 D
(58) Field of Classification Search .................. 24/68 B, 24/71.1, 182, 614, 615, 275–277, 68 CD, 24/68 CT, 68 BT, 68 TT, 68 R, 265 BC, 265 CD, 24/298, 302, 265 R, 569, 68 D; 410/100
See application file for complete search history.

(56) References Cited

U.S. PATENT DOCUMENTS

| | | | |
|---|---|---|---|
| 1,276,702 A | 8/1918 | Anderson | |
| 3,028,645 A * | 4/1962 | Stearman et al. | 24/68 TT |
| 3,279,759 A | 10/1966 | Tallman | |
| 3,960,359 A | 6/1976 | Svahn et al. | |
| 4,560,147 A * | 12/1985 | Bowdren | 254/231 |
| 5,159,729 A | 11/1992 | Walker | |
| 5,623,751 A | 4/1997 | Knutson | |
| 5,809,620 A * | 9/1998 | Crowley et al. | 24/302 |
| 5,975,454 A | 11/1999 | Potter et al. | |
| 6,655,097 B1 * | 12/2003 | Poolaw | 52/127.2 |
| 6,696,193 B2 * | 2/2004 | Bonk et al. | 429/459 |
| 2004/0253073 A1 * | 12/2004 | Gohata | 410/100 |
| 2007/0122247 A1 | 5/2007 | Madachy et al. | |
| 2008/0083096 A1 * | 4/2008 | Wilkinson | 24/298 |

FOREIGN PATENT DOCUMENTS

EP  0 816 250 A1  1/1998

* cited by examiner

*Primary Examiner* — Robert J Sandy
*Assistant Examiner* — Abigail E Morrell
(74) *Attorney, Agent, or Firm* — Hudak, Shunk & Farine Co., LPA

(57) ABSTRACT

A device for securing cargo, items or other objects, in particular a tie-down binding strap device including at least two different types of tightening mechanisms. The device is also provided in useful embodiments with interchangeable ends that can be secured to a variety of structures, even itself. The features of the device provide versatility and allow the device to secure cargo having different shapes.

18 Claims, 2 Drawing Sheets

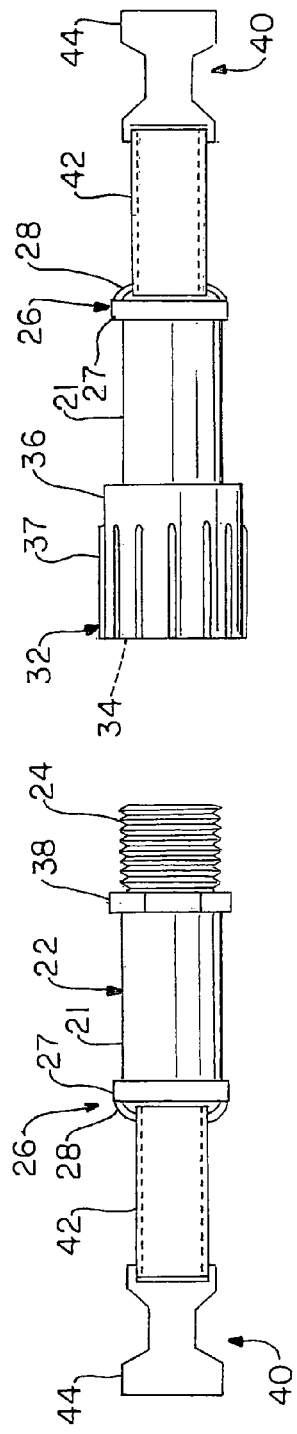
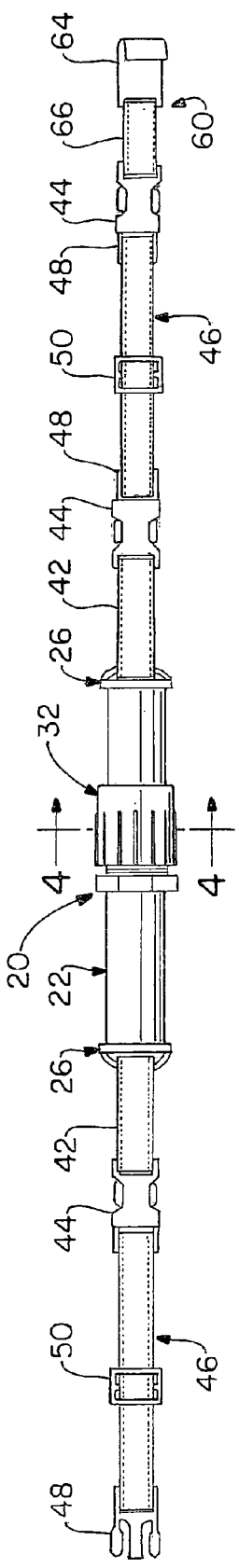
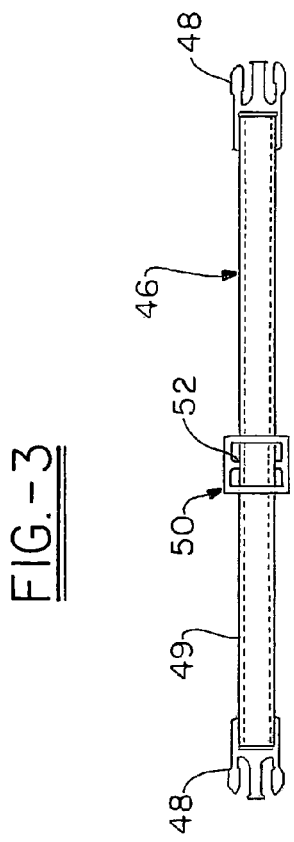
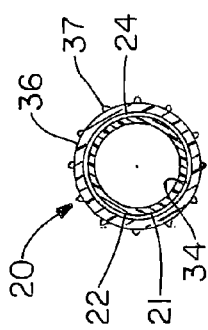
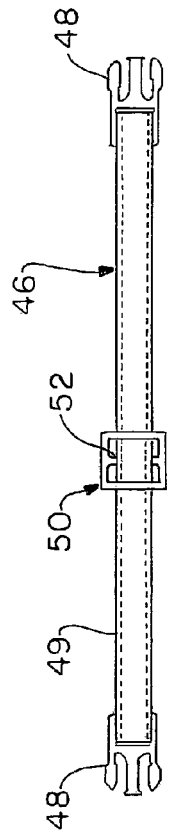

BINDING STRAP DEVICE FOR SECURING CARGO

FIELD OF THE INVENTION

The present invention relates to a device for securing cargo, items or other objects, in particular a tie-down binding strap device including at least two different types of tightening mechanisms. The device is also provided in useful embodiments with interchangeable ends that can be secured to a variety of structures, even itself. The features of the device provide versatility and allow the device to secure cargo having different shapes.

BACKGROUND OF THE INVENTION

Various items and objects are secured in a location, and are often transported from one location to another in numerous different types of vehicles, such as cars, trucks, and trailers. It is important for safety reasons to secure cargo, especially carried by a vehicle to prevent injury or damage to people, the vehicle, the vehicle's occupants, other vehicles, and areas where the cargo-carrying vehicle travels or wherever the cargo is stored.

In order to achieve this object, many diverse solutions have been offered.

U.S. Pat. No. 1,276,702 relates to a clothes line stretcher and has for an object the provision of a device which may be applied to the line at any convenient point and which is reportedly readily operable to remove the slack from the line.

U.S. Pat. No. 3,279,759 relates to line tightening devices and is especially concerned with a tightening device by means of which slack in a line is reportedly automatically taken up and a set amount of tension maintained in the line. The device has a tightener of the type which reportedly can be used in company with a rope or chain which is used to tie down heavy loads on a vehicle such as lumber, pipes, crates or in fact any kind of object which needs to be roped or chained to a vehicle and under circumstances where, as the vehicle jogs over a road, the rope or chain is apt to become loose enough to allow the load to be dislodged.

U.S. Pat. No. 3,960,359 relates to a stretching screw comprising two attachment sections arranged for displacement relative one another and having a stop means arranged in the second attachment section so as to prevent turning movements of said second attachment section relative to said first attachment section upon displacement of said sections relative to one another. The stretching screw is self-locking and may be reportedly adjusted with one hand with the aid of e.g. a spanner.

U.S. Pat. No. 4,560,147 relates to a U-strap that mounts a nut between the legs of the strap for rotation perpendicular to the longitudinal axis of the strap. The nut is provided with a threaded bore which threadably receives an adjustment sleeve. The adjustment sleeve is also threaded internally reversely to its external threads and threadably receives a stud connected to or constituting a first member to be placed under tension with respect to a second member coupled to or constituting the strap. The turnbuckle is reportedly useful in mounting standard wire or rod rigging on a sailboat or sailing yacht.

U.S. Pat. No. 5,159,729 relates to a tie-down device for securing and holding down cargo and the like. The device includes a turnbuckle. A strap is provided having a first end and a second end that are secured to the turnbuckle, so as to loop back on itself and defining a loose strap and a stationary strap. A first hook is carried by the turnbuckle. A second hook is carried by the strap between the loose and stationary straps. Rotation of the turnbuckle in a first tightening direction wraps the loose strap around the stationary strap, shortening the loose strap for tightening the device and securing and holding down the cargo and the like and also locking the loose strap in place. Rotation of the turnbuckle in a second loosening direction unwraps the loose strap from around the stationary strap, lengthening the loose strap for untightening the device and unsecuring and releasing the cargo and the like.

U.S. Pat. No. 5,623,751 relates to a tie-down device for securing cargo bindings. The device includes a housing unit with a hollow cavity therein. A threaded screw extending through the bore of the cavity and projecting through an opening in a closed end of the housing unit and secured to a threaded fastener. The invention further includes a threaded nut and capture assembly fixedly attached to the opposing end of the threaded screw that is able to extend and retract through an open end of the housing unit. The threaded screw can be turned to a first position projecting the capture assembly through the open end to either capture or loosen bindings. The threaded screw can be turned to a second position causing the secured bindings to be retracted into the housing unit facilitating their tightening.

U.S. Pat. No. 5,975,454 relates to a hand held strap winder has an oval, planar base with a hand grip, a hub on which the strap is wound and a strap guide aligned on the major axis of the oval base.

U.S. Publication No. 2007/0122247 relates to a cargo tightener and strap collector having a rotatable shaft provided on the lever portion of the cargo tightener and strap collector. A slot is provided in the shaft so that the free end of a strap may be inserted in the slot and wound on the shaft to secure the strap and reportedly prevent its fluttering in the wind or trailing on the ground while in use.

European Patent No. 0 816 250 relates to a method for binding timber packages in particular into reportedly suitable tight and firm packages. Another object of the invention is a device which is used to implement the method. The device comprises a body part (1) similar to a cotton reel and flanges (3) integral with it. According to the invention, the body part (1) comprises an axial slot (2) that goes through the body part, for threading the ends of the tie through it, and at least two radial bores (3) which penetrate the body part and preferably form a 90 degree angle with one another, located in the axial direction spaced from one another, for receiving separate tightening and locking members (7).

In view of the above there remains a need for an adaptable binding strap device that is useful for securing cargo of various size and types to different vehicles, quickly and safely.

SUMMARY OF THE INVENTION

In view of the above, it is an object of the present invention to provide a securing system including a device for securing items, objects or cargo having at least two different types of tightening mechanisms.

A further object is to provide a tie-down binding strap device that includes a hand manipulatable rotary tightening mechanism, preferably centrally located between fastening ends of device.

Yet a further object is to provide a rotary tightening mechanism having a hand turnable female fitting having threads engagable with a threaded male fitting that allows quick, smooth and uniform adjustment, both tightening and loosening.

Still another object is to provide the rotary tightening mechanism with a manual lock to maintain the rotary tightening mechanism in a set position.

An additional object of the present invention is to provide the device with interchangeable fastening ends of different types that can be operatively connected to a bearing clip operatively connected to the rotary tightening mechanism.

A further object of the invention is to provide a second tightening mechanism located between the rotary tightening mechanism and at least one of the fastening ends, in particular a strap-type tightening mechanism, such as including a single buckle, a cam-buckle or even a ratcheting type tightening mechanism.

In one aspect a binding strap device is disclosed comprising a rotary tightening mechanism including a male fitting moveable in relation to a female fitting to increase or decrease a length of the binding strap device, the rotary tightening mechanism further including a bearing clip having a first end connected to the female fitting and a second bearing clip having a first end connected to the male fitting, each bearing clip having a second end with a clip rotatable in relation to the fitting to which the clip is connected, each clip operatively connected to a bearing clip connector, an intermediate section connected to one of the connectors of the rotary tightening mechanism by a first connector, the intermediate section including a strap tightening mechanism, the strap tightening mechanism including a strap and a mechanism that adjusts a length of the strap; and a fastening end having a connector removably connected to a second connector of the intermediate section.

In a further aspect a binding strap device is disclosed comprising a rotary tightening mechanism including a male fitting moveable in relation to a female fitting to increase or decrease a length of the binding strap device, the rotary tightening mechanism further including a bearing clip having a first end connected to the female fitting and a second bearing clip having a first end connected to the male fitting, each bearing clip having a second end with a clip rotatable in relation to the fitting to which the clip is connected, each clip operatively connected to a bearing clip connector, wherein each clip is operatively connected to a female connector; an intermediate section having a male connector connected to each female connector of the rotary tightening mechanism, at least one intermediate section including a strap tightening mechanism, the strap tightening mechanism including a strap and one or more of a buckle, cam lock, and a ratchet mechanism that adjusts a length of the strap, and each intermediate section including a second male connector; and a fastening end having a female connector connected to the second male connector of the intermediate section.

In a further aspect a method for securing an item is disclosed comprising the steps of obtaining a binding strap device, comprising a rotary tightening mechanism including a male fitting moveable in relation to a female fitting to increase or decrease a length of the binding strap device, the rotary tightening mechanism further including a bearing clip having a first end connected to the female fitting and a second bearing clip having a first end connected to the male fitting, each bearing clip having a second end with a clip rotatable in relation to the fitting to which the clip is connected, each clip operatively connected to a bearing clip connector, an intermediate section connected to one of the connectors of the rotary tightening mechanism by a first connector, the intermediate section including a strap tightening mechanism, the strap tightening mechanism including a strap and a mechanism that adjusts a length of the strap; and a fastening end having a connector removably connected to a second connector of the intermediate section; connecting at least one intermediate section to a connector of the rotary tightening mechanism; and securing the device and an object to a location by actuating the rotary tightening mechanism and strap tightening mechanism.

BRIEF DESCRIPTION OF THE DRAWINGS

The invention will be better understood and other features and advantages will become apparent by reading the detailed description of the invention, taken together with the drawings, wherein:

FIG. 1 is a side elevational view of a portion of one embodiment of a binding strap device of the invention illustrating a male portion of a rotary tightening mechanism operatively connected to a bearing clip, the bearing clip connected to a base adapted to be connected to a fastening end;

FIG. 2 is a side elevational view of a portion of one embodiment of a binding strap device of the invention illustrating a female receptacle of a rotary tightening mechanism operatively connected to a bearing clip, the bearing clip connected to a base adapted to be connected to a fastening end;

FIG. 3 is a side elevational view of one embodiment of the binding strap device of the invention;

FIG. 4 is a cross-sectional view through a portion of the rotary tightening mechanism of the invention showing the male fitting located in the female receptacle;

FIG. 5 is a side elevational view of one embodiment of a second tightening mechanism of the invention adjustably connected between connector ends of an intermediate section of the device.

DETAILED DESCRIPTION OF THE INVENTION

Figure 6A:
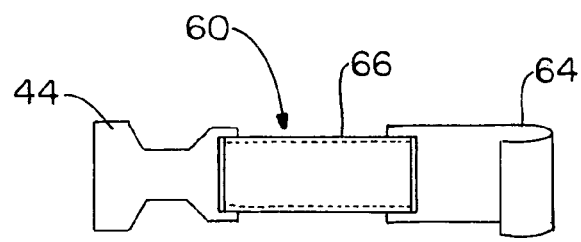
FIGS. 6A, 6B and 6C illustrate various embodiments of interchangeable fastening ends connectable to the female receiver.

The binding strap device of the present invention is adaptable to the needs of the user and can be fastened to a large variety of items and objects, even itself in some embodiments. The versatility of the device allows it to secure cargo or other items having different shapes.

Referring now to the drawings, FIG. 3 illustrates one embodiment of an assembled binding strap device 10 of the present invention including a first tightening mechanism, in particular a rotary tightening mechanism 20, and a second tightening mechanism, in particular, a strap tightening mechanism 50 located between the rotary tightening mechanism 20 and a fastening end 60 of the device.

FIG. 1 illustrates one portion of the rotary tightening mechanism 20, namely a male fitting 22 having a threaded end 24 matable with a threaded receptacle 34 of female fitting 32 illustrated in FIG. 2. The male fitting 22 in the embodiment includes a post 21 that includes the threaded end 24. The post 21 can be formed from a durable material such one or more of a polymer or a metal, with a polymer being preferred. A bearing clip 26 is connected to the opposite end of post 21. The bearing clip 26 includes a rotatable bearing 27 having one segment fixed to post 21 and a second end connected to a clip 28, with the clip 28 being rotatable in relation to post 21.

A base 40 is connected to clip 28 at one end through strap 42 of the base. A second end of strap 42 is attached to a connector 44 that can be connected to an appropriate connector mateable therewith. The connector 44 illustrated in FIG. 1 is a female connector, adapted to be connected to a male connector 48 of intermediate section 46. The male connector 48 snaps into connector 44 and can be released by depressing the ends thereof and pulling the male connector 48 out of the female connector 44. In an alternate embodiment, connector 44 can be a male connector and connector 48 a female connector.

The female fitting 32 of rotary tightening mechanism 20 includes a rotatable handle 36 used to adjust the connection between female fitting 32 and male fitting 22. The handle 36 is manually operated by hand and can include a grip 37 to make the handle 36 easier to manipulate. Grip 37 can be in the form of, for example, raised projections, recesses, etc., for example a rubber or elastomeric grip having raised notches molded or attached to the main body of the handle 36, or a combination thereof. FIG. 4 illustrates a cross-sectional view through lines 4-4 of FIG. 3 of the rotary tightening mechanism 20 showing male fitting 21 threaded end 24 located inside the female fitting 32 threaded receptacle 34. In order to adjust the length of the binding strap device 10, the female fitting 32 is rotated by hand in relation to male fitting 22. When the female fitting 32 is drawn further onto post 21 of the male fitting 22, the length of the binding strap device 10 is decreased and when the female fitting 32 is rotated towards the threaded end 24 of the male fitting 22, the length of the binding strap device 10 is increased. Due to the presence of bearing clips 26 and optionally a rotatable connection between post 21 and female fitting handle 36, twisting of the straps 42 and 49 located laterally outward from the rotary tightening mechanism 20 is prevented. When the female fitting 32 is in a desired position with respect to male fitting 22, and in particular, an object or other item is secured as desired, a lock 38 can be activated to prevent movement between the male fitting 22 and female fitting 32. The lock 38 in one embodiment is a threaded nut located on post 21 that can be tightened against the female fitting 32 to prevent rotation thereof.

The intermediate section 46 also includes the strap tightening mechanism 50 that allows the length of intermediate section 46 to be adjusted. The strap tightening mechanism 50 utilized can vary and in some embodiments can include one or more of a buckle, a cam lock, a ratchet mechanism. A buckle 52 is shown in FIG. 5. Strap 49 can have any desired overall length that can be adjusted by the strap tightening mechanism 50.

Figure 6B:
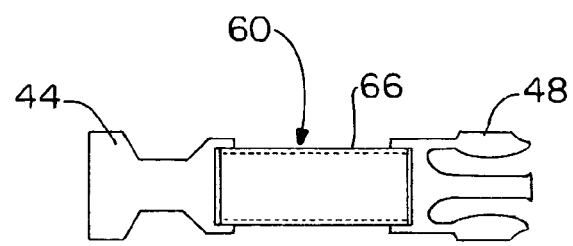
Figure 6C:
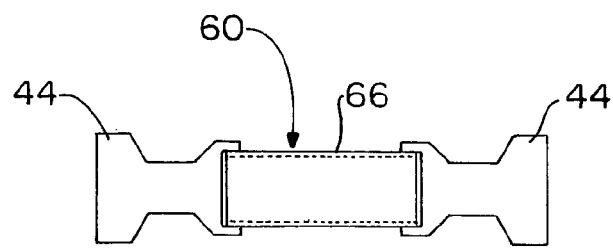

In an important aspect of the present invention, the binding strap device 10 is provided with fastening ends 60 having a plurality of different end connectors that are interchangeable in order to be able to connect the device to a wide variety of items, see FIGS. 6A, 6B and 6C or even itself where desired. The fastening end 60 is removably connected to intermediate section 46 at one end.

The fastening end 60 of FIG. 6A includes a female connector 44 that is adapted to be removably connectable to male connector 48 of intermediate section 46. The opposite end includes a hook 64, for example in the form of a J-shaped hook. The fastening end 60 also includes a strap 66 located between connectors that can be any desired length. FIG. 6B illustrates an embodiment wherein the fastening end 60 includes a female connector 44 at one end and a male connector 48 at a second end that are connected by a strap 66. Depending upon the object to be secured and the object to which the binding strap device 10 is to be connected the ends can be utilized interchangeably to connect the device 10 to the object, another item, or even itself, such as when the device is wrapped around the object, as well as a portion of a vehicle.

The binding strap device of the present invention can be utilized in one embodiment as follows. In view of the construction of the device, the same can be utilized in many different ways in order to secure many different items. The size of the items can range from a small size to a very large size and can be located in generally any location, such as a trailer, a bed of a truck, a roof of a vehicle, etc. The design of the device allows the same to be attached quickly. The user assesses the size of the item to be secured as well as the location to which the device will be secured. The male fitting and female fitting of the rotary tightening mechanism are rotably connected to each other, with preferably a minimum number of rotations to ensure connection between the fittings before a final tightening step is performed and the rotary tightening mechanism locked with the lock when the cargo or other items are in a secured position as desired. At least one intermediate section is connected to a base of the rotary tightening mechanism such as by connecting a male fitting to a female fitting. If a second fitting of the intermediate section is to be connected to the device itself to a fitting of the base, no additional parts of the binding strap device need to be connected to the assembly. In this case, once a loop is formed with the device at least about the item to be secured, and any other object such as a portion of the vehicle, for example a roof. Preferably, the strap type tightening mechanism is actuated to produce a relatively snug fit. Also, the rotary tightening mechanism is actuated by rotating the male fitting in relation to the female fitting to provide the desired degree of tension. Afterwards, the lock is utilized to prevent further rotation of the female fitting of the rotary tightening mechanism.

In a further embodiment, wherein it is desired to utilize at least one intermediate section, and preferably two intermediate sections; and at least one fastening end, and preferably two fastening ends; the desired intermediate section and fastening end connected thereto are connected to the rotary tightening mechanism as described herein. Thus, in one embodiment, the male and female fittings of the rotary tightening mechanism are connected and an intermediate section is connected to a base of the rotary tightening mechanism. A fastening end is also connected to the other end of the intermediate section and the fastening end connected to a desired location. The strap-type tightening mechanism and rotary tightening mechanism are adjusted to provide the desired securement and tightness.

At a desired location and/or time, the tension on the binding trap device is released by disengaging one or more of the rotary tightening mechanism and the strap-type tightening mechanism.

In accordance with the patent statutes, the best mode and preferred embodiment have been set forth, the scope of the invention is not limited thereto, but rather by the scope of the attached claims.

What is claimed is:

1. A binding strap device, comprising:
a rotary tightening mechanism including a male fitting moveable in relation to a female fitting to increase or decrease a length of the binding strap device, the rotary tightening mechanism further including a bearing clip having a first end connected to the female fitting and a second bearing clip having a first end connected to the male fitting, each bearing clip having a second end with a clip rotatable in relation to the fitting to which the clip is connected, each clip operatively connected to a bearing clip connector;
an intermediate section connected to one of the connectors of the rotary tightening mechanism by a first connector, the intermediate section including a strap tightening mechanism, the strap tightening mechanism including a strap and a mechanism that adjusts a length of the strap; and a fastening end having a connector removably connected to a second connector of the intermediate section.

2. The binding strap device according to claim 1, wherein the rotary tightening mechanism male fitting includes a post including a threaded end with the post having a second end being connected to the bearing clip, and wherein the female fitting includes a post operatively connected to a threaded receptacle, the threaded receptacle threadably receiving the threaded end of the male fitting, the female fitting post rotatably connected to the bearing clip.

3. The binding strap device according to claim 2, wherein each bearing clip includes a bearing rotatably connected to the respective fitting to which the bearing clip is connected.

4. The binding strap device according to claim 3, wherein the clip is connected to a strap that is connected to the bearing clip connector.

5. The binding strap device according to claim 4, wherein the first and second connectors of the intermediate section are male connectors, the first connector connected to a female connector of the rotary tightening mechanism, and wherein two intermediate sections are present.

6. The binding strap device according to claim 5, wherein the intermediate section strap tightening mechanism is one or more of a buckle, a cam lock, and a ratchet mechanism.

7. The binding strap device according to claim 6, wherein a fastening end is connected to the second connector of each intermediate section.

8. The binding strap device according to claim 7, wherein each fastening end includes one or more of a j-hook, a male connector and a female connector.

9. A binding strap device, comprising:
a rotary tightening mechanism including a male fitting moveable in relation to a female fitting to increase or decrease a length of the binding strap device, the rotary tightening mechanism further including a bearing clip having a first end connected to the female fitting and a second bearing clip having a first end connected to the male fitting, each bearing clip having a second end with a clip, rotatable in relation to the fitting to which the clip is connected, each clip operatively connected to a bearing clip connector, wherein each clip is operatively connected to a female connector;
two intermediate sections each having a male connector, the male connectors each connected to one of the female connectors of the rotary tightening mechanism, at least one intermediate section including a strap tightening mechanism, the strap tightening mechanism including a strap and one or more of a buckle, cam lock, and a ratchet mechanism that adjusts a length of the strap, and each intermediate section including a second male connector; and
a fastening end having a female connector connected to the second male connector of one of the intermediate sections.

10. The binding strap device according to claim 9, wherein the rotary tightening mechanism male fitting includes a post including a threaded end with the post having a second end being connected to the bearing clip, and wherein the female fitting includes a post operatively connected to a threaded receptacle, the threaded receptacle threadably receiving the threaded end of the male fitting, the female fitting post rotatably connected to the bearing clip.

11. The binding strap device according to claim 10, wherein each bearing clip includes a bearing rotatably connected to the respective fitting to which the bearing clip is connected.

12. The binding strap device according to claim 9, wherein two fastening ends are present with one connected to each intermediate section.

13. The binding strap device according to claim 12, wherein the rotary tightening mechanism includes a handle connected to the female fitting for rotating the female fitting in relation to the male fitting.

14. The binding strap device according to claim 13, wherein each fastening end includes one or more of a j-hook, a male connector and a female connector.

15. A method for securing an item, comprising the steps of:
obtaining a binding strap device, comprising a rotary tightening mechanism including a male fitting moveable in relation to a female fitting to increase or decrease a length of the binding strap device, the rotary tightening mechanism further including a bearing clip having a first end connected to the female fitting and a second bearing clip having a first end connected to the male fitting, each bearing clip having a second end with a clip rotatable in relation to the fitting to which the clip is connected, each clip operatively connected to a bearing clip connector; an intermediate section connected to one of the connectors of the rotary tightening mechanism by a first connector, the intermediate section including a strap tightening mechanism, the strap tightening mechanism including a strap and a mechanism that adjusts a length of the strap; a fastening end having a connector removably connected to a second connector of the intermediate section; and
securing the device and an object to a location by actuating the rotary tightening mechanism and strap tightening mechanism.

16. The method according to claim 15, further including the step of connecting a second intermediate section to the other connector of the rotary tightening mechanism.

17. The method according to claim 16, wherein each intermediate section has a fastening end removably connected thereto.

18. The method according to claim 17, further including the steps of adjusting the length of the strap tightening mechanism and thereafter rotating the female fitting in relation to the male fitting to adjust the length of the binding strap device.

* * * * *